United States Patent
Yamine et al.

(10) Patent No.: US 9,692,682 B2
(45) Date of Patent: Jun. 27, 2017

(54) METHODS AND NETWORK NODES FOR HANDLING HANDOVER FAILURES

(71) Applicant: Telefonaktiebolaget L M Ericsson (publ), Stockholm (SE)

(72) Inventors: Badawi Yamine, Beirut (LB); Johan Moe, Mantorp (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 87 days.

(21) Appl. No.: 14/440,371

(22) PCT Filed: Nov. 8, 2012

(86) PCT No.: PCT/SE2012/051213
§ 371 (c)(1),
(2) Date: May 4, 2015

(87) PCT Pub. No.: WO2014/074035
PCT Pub. Date: May 15, 2014

(65) Prior Publication Data
US 2015/0281040 A1  Oct. 1, 2015

(51) Int. Cl.
*H04W 36/00* (2009.01)
*H04L 12/26* (2006.01)
(Continued)

(52) U.S. Cl.
CPC .......... *H04L 43/16* (2013.01); *H04L 43/0823* (2013.01); *H04W 24/02* (2013.01);
(Continued)

(58) Field of Classification Search
CPC ..... H04W 24/02; H04W 36/00; H04W 88/08; H04W 36/165; H04W 36/30;
(Continued)

(56) References Cited

U.S. PATENT DOCUMENTS

| | | | |
|---|---|---|---|
| 2009/0047956 A1* | 2/2009 | Moe | H04J 11/0093 455/436 |
| 2009/0201810 A1* | 8/2009 | Kazmi | H04L 12/5695 370/232 |

(Continued)

FOREIGN PATENT DOCUMENTS

| | | |
|---|---|---|
| WO | 2008102252 A1 | 8/2008 |
| WO | 2010036161 A1 | 4/2010 |
| WO | 2012008887 A1 | 1/2012 |

OTHER PUBLICATIONS

3rd Generation Partnership Project, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10)", Technical Specification, 3GPP TS 36.300 V10.7.0, Mar. 1, 2012, pp. 1-194, 3GPP, France.

(Continued)

*Primary Examiner* — Meless Zewdu
(74) *Attorney, Agent, or Firm* — Coats & Bennett, PLLC (57) ABSTRACT

There is provided a method performed by a first network node (101) for handling handover failures for a target cell (112), which target cell is applicable for handover of a wireless device (121) in a wireless communications network (100) from a source cell (111) to the target cell. The target cell is associated (202) with an indication indicating that the target cell is unsuitable for handover, when an amount of failed handovers from the source cell to the target cell exceeds (201) a failure threshold.

27 Claims, 3 Drawing Sheets

(51) Int. Cl.
H04W 24/02 (2009.01)
H04W 36/16 (2009.01)
H04W 36/30 (2009.01)
H04W 88/08 (2009.01)

(52) U.S. Cl.
CPC ......... *H04W 36/165* (2013.01); *H04W 36/30* (2013.01); *H04W 36/00* (2013.01); *H04W 88/08* (2013.01)

(58) Field of Classification Search
CPC . H04W 36/16; H04W 76/027; H04W 76/028; H04W 38/18; H04W 36/0016; H04W 36/0005; H04W 36/0055; H04W 36/0061; H04W 36/0083; H04W 40/36; H04W 36/02; H04W 36/0077; H04L 43/0823; H04L 43/16; H04L 12/26; H04B 7/18541
See application file for complete search history.

(56) References Cited

U.S. PATENT DOCUMENTS

| | | | | |
|---|---|---|---|---|
| 2009/0264119 A1* | 10/2009 | De Pomian | ........... | H04W 24/08 455/424 |
| 2009/0318132 A1* | 12/2009 | Chiou | ............ | H04W 24/08 455/423 |
| 2009/0323638 A1* | 12/2009 | Catovic | ............ | H04W 36/0083 370/331 |
| 2010/0173626 A1* | 7/2010 | Catovic | ............... | H04W 76/027 455/423 |
| 2010/0323687 A1* | 12/2010 | Richter | ................ | H04W 24/04 455/424 |
| 2011/0086634 A1* | 4/2011 | Rahman | ................ | H04W 24/08 455/423 |
| 2011/0159901 A1* | 6/2011 | Frenger | ................ | H04L 5/0082 455/502 |
| 2011/0207452 A1* | 8/2011 | Grob-Lipski | ..... | H04W 36/0033 455/423 |
| 2012/0083262 A1* | 4/2012 | Dimou | ............. | H04W 36/0055 455/423 |
| 2012/0252440 A1* | 10/2012 | Watanabe | ............ | H04W 24/02 455/423 |
| 2013/0084910 A1* | 4/2013 | Suzuki | .................. | H04W 24/02 455/515 |
| 2013/0143555 A1* | 6/2013 | Singh | ................ | H04W 36/0077 455/434 |
| 2014/0057634 A1* | 2/2014 | Chang | .................. | H04W 36/32 455/437 |

OTHER PUBLICATIONS

Jansen, T., et al., "Handover parameter optimization in LTE self-organizing networks", 2010 IEEE 72nd Vehicular Technology Conference Fall, Sep. 6, 2010, pp. 1-5, IEEE.

3rd Generation Partnership Project, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)", Technical Specification, 3GPP TS 36.300 V11.3.0, Sep. 1, 2012, pp. 171-175, 3GPP, France.

3rd Generation Partnership Project, "3rd Generation Partnership Project; Technical Specification Group Radio Access Network; Evolved Universal Terrestrial Radio Access Network (E-UTRAN); X2 application protocol (X2AP) (Release 11)", Technical Specification, 3GPP TS 36.423 V11.2.0, Sep. 1, 2012, pp. 1-136, 3GPP, France.

Huawei, "Recovery after handover failure in target cell," 3GPP TSG RAN WG2 #61 bis, R2-081643, 3rd Generation Partnership Project, Agenda Item 4.3.2, Shenzen, China, Mar. 31, 2008, pp. 1-2.

T-Mobile, et al. "SON use cases for eNB measurements," 3GPP TSG RAN WG2 #58bis, Tdoc-R2-072725, 3rd Generation Partnership Project, Agenda Item 4.8, Orlando, FL, Jun. 25, 2007, pp. 1-3.

3rd Generation Partnership Project, "LTE; Evolved Universal Terrestrial Radio Access Network (E-UTRAN); X2 Application Protocol (X2AP)", Technical Specification, ETSI TS 136 423 V10.5.0 (3GPP TS 36.423 version 10.5.0 Release 10), Mar. 1, 2012, pp. 1-137, ETSI.

* cited by examiner

METHODS AND NETWORK NODES FOR HANDLING HANDOVER FAILURES

TECHNICAL FIELD

Embodiments herein relate to a first network node, a second network node and methods performed therein. In particular, embodiments herein relate to handling handover failures for a target cell, which target cell is applicable for handover of a wireless device in a wireless communications network from a source cell to the target cell.

BACKGROUND

Development within wireless technology has been, and still is, on rampage. The use of wireless communications networks, sometimes also referred to as cellular communications networks, cellular radio system or cellular networks, continues to grow rapidly. New wireless technologies and standards are constantly emerging. Universal Mobile Telecommunications System (UMTS) is a third generation mobile communication system, which evolved from the Global System for Mobile Communications (GSM) and is intended to provide improved mobile communication services based on Wideband Code Division Multiple Access (WCDMA) access technology. UMTS Terrestrial Radio Access Network (UTRAN) is essentially a radio access network using wideband code division multiple access. The 3rd Generation Partnership Project Long Term Evolution (3GPP LTE) has undertaken to evolve further the UTRAN and GSM based radio access network technologies, and 3GPP LTE radio access standard has been written in order to support high bitrates and low latency both for uplink and downlink traffic.

A wireless device, which may also be referred to as e.g. a user equipment (UE) terminal, mobile terminal, wireless terminal and mobile station, may be enabled to communicate wirelessly in any of such wireless communications networks. A wireless communications network may cover a geographical area which is divided into cell areas, wherein each cell area is served by a base station. A cell is the geographical area where radio coverage is provided by the base station at a base station site. Each base station may serve one or several cells, and furthermore, each base station may support one or several communication technologies and be directly connected to one or more core networks. Depending on the technology and terminology used, a base station may be referred to as e.g. a Radio Base Station (RBS), Base Transceiver Station (BTS), B node, NodeB, Evolved Node B (eNodeB), or eNB, and the term "base station" is used in this description to denote any of these. The base stations may communicate over the air interface operating on radio frequencies with the wireless devices within range of the base stations.

A wireless device may be subjected to handover from one cell to another. One reason may for instance be that more efficient utilization of capacity is sought after, and another that the wireless device is moving away from an area covered by one cell—the source cell—and is entering an area covered by another cell—e.g. a target cell—which therefore provides better radio conditions for the wireless device. For practical realization of handover, each cell may be assigned a list of potential target cells, which can be used for handover. These potential target cells may be referred to as neighbour cells and the list of potential target cells referred to as a neighbour list. Creating such a list for a given cell is not trivial, and implementations come in a wide variety. For instance, different algorithms may utilize input data from field measurements or computer predictions of radio wave propagation in the areas covered by the cells.

Manually provisioning and managing neighbour cells in wireless networks may be challenging, and it becomes more difficult as new technologies are being rolled out while 2G/3G cells still remain. In the case of 3GPP LTE, for instance, in addition of defining intra LTE neighbour relations (NRs) for eNBs, operators need to provision neighbouring 2G, 3G, CDMA2000 cells as well. Accordingly, a purpose of the Automatic Neighbour Relation (ANR) functionality of 3GPP LTE is to relieve the operator from the burden of manually managing NRs. The ANR function may reside in an eNB and support a neighbour list by means of the conceptual Neighbour Relation Table (NRT). The ANR function may allow e.g. Operation & Maintenance (O&M) to be informed about changes, define attributes, and manage the NRT, such that O&M can add and delete NRs. Furthermore, the implementation specific Neighbour Detection Function may find new neighbours and add them to the NRT, while the Neighbour Removal Function may remove outdated NRs.

In order to manage NRs in an automatic manner, a source base station of a source cell may, as a part of a normal call procedure, instruct a wireless device in the source cell to perform measurements on neighbour cells. In response to such an instruction, the wireless device may send a measurement report regarding a specific neighbour cell, which for instance is triggered as a consequence of a strong Reference Signal Received Power (RSRP). The report may contain the specific cell's Physical Cell Identifier (PCI), and upon reception thereof, the source base station may instruct the wireless device to read, and report back, the Eutran Cell Global Identifier (ECGI), the Tracking Area Code (TAC), and all available Public Land Mobile Network (PLMN) ID(s) of that specific cell. Next, the source base station may decide to add a NR for the cell to the NRT, whereby that neighbour cell may be applicable for handover of a wireless device from the source cell.

Handover attempts to a neighbour cell may, however, fail. A handover procedure may fail whenever there is a failure at any stage in the handover process, and the failure may be related to hardware as well as software issues. On one hand, failure may occur when a source base station sends a handover request message to a target base station, and the target base station rejects the request by responding with a handover preparation failure message. This could be due to many reasons, for instance that there are no radio resources available in the target cell or due to a hardware failure. Reasons of failure are, in the case of LTE, listed in 3GPP 36.423 E-UTRAN X2 Application Protocol (sections 8.2.1.3 Unsuccessful Operation and 8.2.1.4 Abnormal Conditions).

On the other hand, however, based on field experience, the handover procedure may also fail at other stages, not necessarily listed. This might be due to hardware or software issues at the target base station, which may cause failure of all incoming handovers from the source cell to that target cell. The target cell may, for instance, be broken or malfunctioning already at the time for the cell relation setup. That is, the target cell that broadcasts, seemingly working from a wireless device perspective, may for instance be sleeping, i.e. the cell's base station is not operating. While such a fault as a sleeping cell remains, one should be careful not to handover a wireless device in that direction. Although a sleeping cell can manifest itself in many ways, the wireless device to be handed over may be destined to face a drop. Thus, one could argue that the relation to a sleeping cell should be removed, and that the source cell subsequently should not consider the target cell a valid neighbour. However, the erroneous condition of the sleeping cell is likely temporary, and one can thus just as well argue that the cell relation should be kept, i.e. that the target cell should remain a valid neighbour. It may still be of value to keep the relation, for instance to support Inter Cell Interference Coordination (ICIC), even though the target cell is not responding to handover requests from the source cell. Thereby, there is, on one side, a risk of the wireless device facing a drop, and on the other, that numerous handover attempts merely results in handover failures. Which approach to take when faced with hardware and/or software issues giving rise to such handover failure behavior, is hence not necessarily obvious.

SUMMARY

It is therefore an object of embodiments herein to provide an improved way of handling handover failures.

According to a first aspect of embodiments herein, the object is achieved by a method performed by a first network node for handling handover failures for a target cell, which target cell is applicable for handover of a wireless device in a wireless communications network from a source cell to the target cell. The first network node associates the target cell with an indication indicating that the target cell is unsuitable for handover, when an amount of failed handovers from the source cell to the target cell exceeds a failure threshold.

According to a second aspect of embodiments herein, the object is achieved by a method performed by a second network node for handling handover failures for a target cell, which target cell is applicable for handover of a wireless device in a wireless communications network from a source cell to the target cell. The second network node receives, from a first network node serving the source cell, information about the target cell being associated with an indication. The indication indicates that the target cell is unsuitable for handover due to an amount of failed handovers from the source cell to the target cell exceeding a failure threshold, and/or due to a subsequent amount of failed handovers from the source cell to the target cell exceeding a verification threshold. Furthermore, the second network node monitors for a problem associated with at least some of the failed handovers and/or the subsequent failed handovers and monitors for a solution event indicating that the problem is restored. Additionally, the second network node informs the first network node about the solution event, when learning of the solution event.

According to a third aspect of embodiments herein, the object is achieved by a first network node for handling handover failures for a target cell, which target cell is applicable for handover of a wireless device in a wireless communications network from a source cell to the target cell. The first network node comprises an associating unit adapted to associate the target cell with an indication indicating that the target cell is unsuitable for handover, when an amount of failed handovers from the source cell to the target cell exceeds a failure threshold.

According to a fourth aspect of embodiments herein, the object is achieved by a second node for handling handover failures for a target cell, which target cell is applicable for handover of a wireless device in a wireless communications network from a source cell to the target cell. The second network node comprises a second receiving unit adapted to receive, from a first network node serving the source cell, information about the target cell being associated with an indication. The indication indicates that the target cell is unsuitable for handover due to an amount of failed handovers from the source cell to the target cell exceeding a failure threshold, and/or due to a subsequent amount of failed handovers from the source cell to the target cell exceeding a verification threshold. The second network node further comprises a second monitoring unit adapted to monitor for a problem associated with at least some of the failed handovers and/or the subsequent failed handovers. The second monitoring unit is further adapted to monitor for a solution event indicating that the problem is restored. Additionally, the second network node comprises a second informing unit adapted to inform the first network node about the solution event, when learning of the solution event.

When a source cell has a cell relation with a target cell, that target cell may be considered applicable for handover of a wireless device. When such a cell relation becomes affected by e.g. a hardware and/or software issue(s), however, handover of a wireless device from the source cell towards that target cell may fail. Rather than just removing the cell relation in order to avoid a drop of the wireless device, or merely keep the cell relation regardless of handover failure issues, the embodiments herein provides a criterion which reveals whether a target cell is deemed appropriate for handover. More specifically, the introduced indication reflects, in an instant manner, when the target cell is deemed unsuitable for handover. For that reason, the way of handling handover failures for a target cell has been improved.

An advantage of embodiments herein may be that by associating the target cell with the indication indicating that the target cell is unsuitable for handover, when an amount of failed handovers has exceeded a failure threshold, the indication effectively reflects that a problem related to some hardware and/or software issue(s) has arisen which obstructs handover of a wireless device to the target cell.

A further advantage of embodiments herein may be that by associating the target cell with the indication indicating that the target cell is unsuitable for handover, when an amount of failed handovers has exceeded a failure threshold, the association is made with immediate reaction once exceeding the failure threshold. Accordingly, with awareness of the arisen association reflecting a status of inappropriate handover due to a hardware and/or software issue(s), continued corresponding signaling handover failures and processing to the target cell may instantly be avoided.

BRIEF DESCRIPTION OF THE DRAWINGS

Examples of embodiments herein are described in more detail with reference to attached drawings in which.

DETAILED DESCRIPTION

According to embodiments herein, relating to handling of handover failures for a target cell being applicable for handover, algorithms residing in one or several entities to be defined in the following, enable the provision of a criterion revealing whether the target cell is deemed appropriate for handover.

Figure 1:
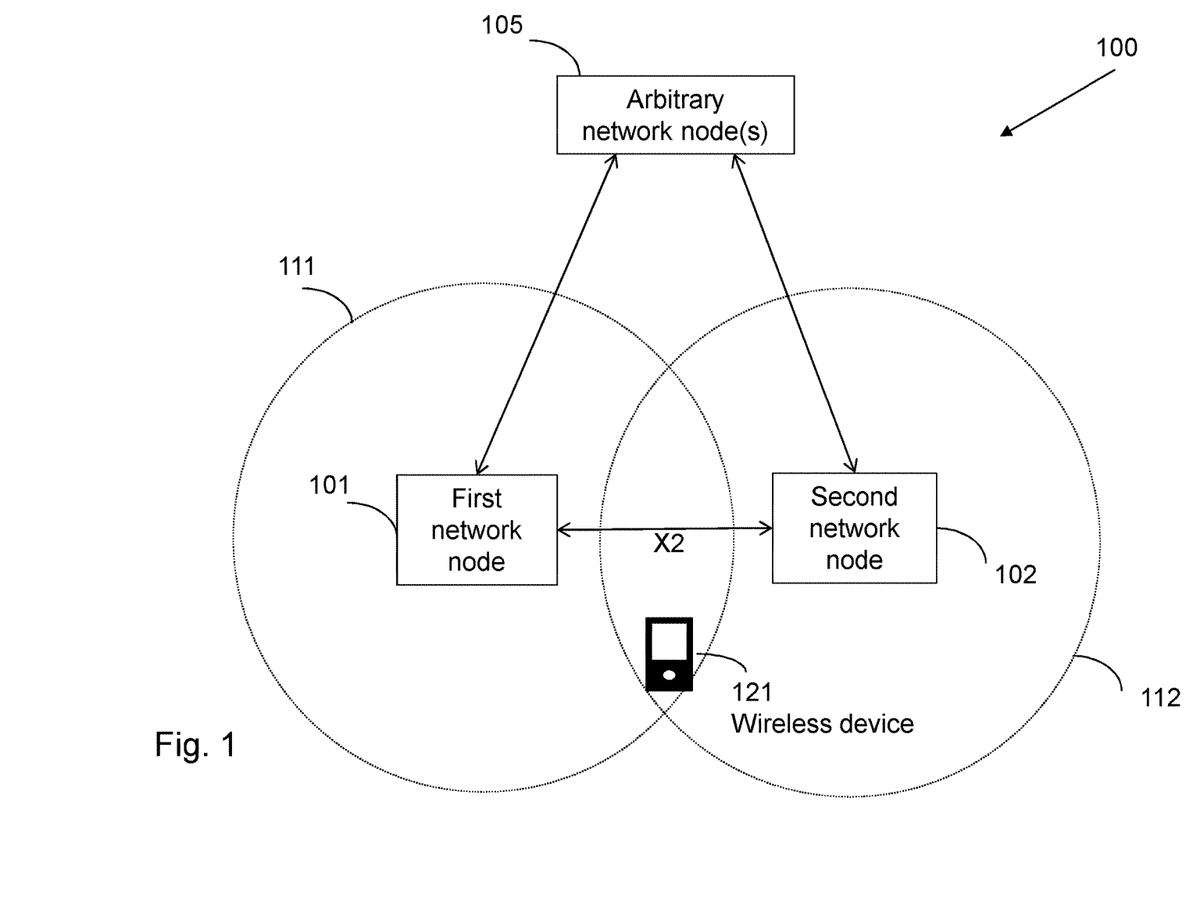
FIG. 1 is a schematic block diagram illustrating a wireless communications network.

FIG. 1 depicts a wireless communications network 100 in which embodiments herein may be implemented. In the example scenario of FIG. 1, the network 100 may be a 3GPP LTE network, e.g. an LTE Frequency Division Duplex (LTE FDD), LTE Time Division Duplex (LTE TDD), or LTE Half-Duplex FDD (LTE HD-FDD) network. In other embodiments, the wireless communications network 100 may be a network such as a WCDMA, UTRA TDD, GSM, GERAN, enhanced data rate for GSM evolution (EDGE) network comprising of any combination of Radio Access Technologies (RATs) such as e.g. Multi-Standard Radio (MSR), base stations, multi-RAT base stations etc., Wimax, or any cellular network or system.

A number of wireless devices may be located in the wireless communications network 100. Each wireless device may be capable of communicating with another wireless device, with a regular telephone and/or with a server via the wireless communications network 100, and possibly via one or more core networks which may be comprised within the wireless communications network 100. In the example scenario of FIG. 1, a single wireless device 121 is depicted. According to embodiments herein, the wireless device 121, commonly referred to as a User Equipment (UE) may be a mobile terminal or wireless terminal, a mobile phone, a computer such as e.g. a laptop, a Personal Digital Assistant (PDA) or tablet computer, sometimes referred to as a surf plate, with wireless capability, a Machine to Machine (M2M) device or any other radio network unit capable to communicate with the wireless communications network 100, or for example, a portable, pocket-storable, hand-held, computer-comprised, or vehicle-mounted mobile device, enabled to communicate voice and/or data, via the wireless communications network 100, with another entity, such as another terminal or a server.

The wireless communications network 100 covers a geographical area which is divided into a plurality of cell areas. In the example scenario of FIG. 1, merely a source cell 111 and a target cell 112 are depicted. The wireless communications network 100 furthermore comprises any number of network nodes such as base stations providing radio coverage in the cells and various management nodes, which may communicate with each other through applicable interfaces. A base station may be a RBS, BTS, B node, eNodeB, eNB, or NodeB, and may be of different classes, such as e.g. a macro eNodeB, home eNodeB or pico base station, based on transmission power and thereby also cell size. In the example scenario of FIG. 1, only a first network node 101, a second network node 102 and an arbitrary network node 105 are depicted for simplicity. The arbitrary network node 105 is intended to represent one or several network nodes, while the first and the second network nodes 101, 102 may respectively be represented by a single arbitrary applicable network node of the wireless communications network 100. According to embodiments herein, the first network node 101 is a source base station serving source cell 111, and the second network node 102 is a target base station serving target cell 112, thus providing radio coverage in the respective cells 111,112. In the example scenario of FIG. 1, given that the wireless communications network 100 is an LTE network, the arbitrary network node 105 may for instance be an Operation and Maintenance System (O&M), e.g. an Operations Support System (OSS), a Mobility Management Entity (MME), a Network Monitoring System (NMS), or a base station. Furthermore, the first and the second network nodes 101,102 in this example may be eNBs, with the ability to communicate with each other through e.g. an X2 interface and with the arbitrary network node 105 through applicable interfaces such as e.g. S1 interfaces.

Example of embodiments of a method performed by the first network node 101 for handling handover failures for the target cell 112, which target cell 112 is applicable for handover of the wireless device 121 in the wireless communications network 100 from the source cell 111 to the target cell 112, will now be described with reference to a flowchart depicted in FIG. 2 and with further reference to FIG. 1. According to some embodiments, handling of handover failures may regard handling handover between nodes within the same technology or between different technologies, such as between UMTS, GSM, LTE, WCDMA, or UTRAN, or between two different operators within the same system. In the example scenario of FIG. 2, the network 100, the network nodes 101,102,105, and the cells 111,112 depicted in FIG. 1 may refer to an LTE network 100, although this method is not limited to any particular type of wireless communications network and nodes therein. Here, the method is discussed in terms of actions that may be performed by the first network node 101, which may also be referred to as the source eNB.

Figure 2:
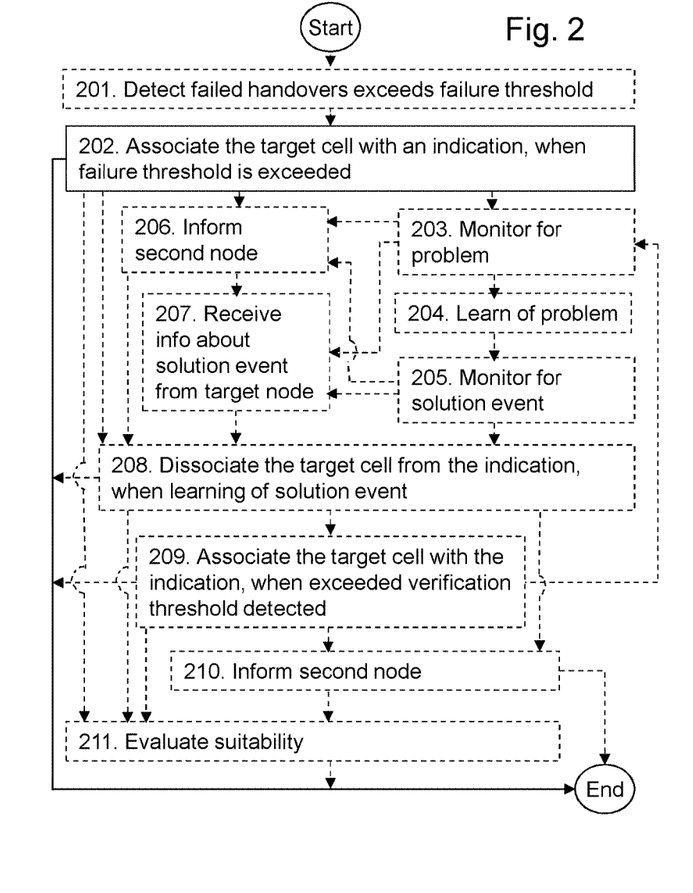
FIG. 2 is a flowchart depicting embodiments of a method performed by a first network node.

Preceding the actions of the flowchart depicted in FIG. 2 may be the assumption that the wireless device 121 is subjected to handover attempts from one cell to another, i.e. from the source cell 111 to the target cell 112. According to embodiments herein, the target cell 112 may be applicable for handover of the wireless device 121 given that the target cell 112 is present in a list of potential target cells, also referred to as neighbour cells, being assigned to the source cell 111. As described in the background, different approaches and criteria for addition and removal of cells to/from such a neighbour cell list may vary depending on implementation.

The method of FIG. 2 comprises the following actions, which actions may be taken in any suitable order. Dashed lines of some boxes in FIG. 2 indicate that these actions are optional and not mandatory.

Action 201

In optional action 201, the first network node 101 may detect that an amount of failed handovers from the source cell 111 to the target cell 112 exceeds a failure threshold. That is, when attempting to handover the wireless device 121 from the source cell 111 to the target cell 112, such an attempt may result in a failed handover. Reasons for such failed handover attempts may vary, and can include a problem related to hardware as well as software issues of any arbitrary network node 101,102,105 or cell 111,112 as described in the background. Detecting the exceeded failure threshold in Action 201 hence enables the first network node to deem that a problem related to hardware and/or software issue(s) is obstructing handover.

The failure threshold may be set to any arbitrary value suitable for the application at hand, for instance ranging from 10-100. Monitoring of the number of failed handover attempts may be performed by the first network node 101 itself, such as when it is the source eNB, or alternatively, the first network node 101 may learn of the exceeded failure threshold from another entity, for instance the second network node 102, such as when being the target eNB, or any arbitrary network node 105. According to one example, detection of consecutive handover failures towards the target cell 112 is performed by the OSS 105, where an algorithm continuously monitors, or is informed of, whether an amount of failed handovers exceeds the failure threshold. A failure counter may be reported by the target eNB, i.e. the second network node 102, to the OSS 105 every period of time, for instance every 5-15 minutes. According to another example, detection of consecutive handover failures is performed at the source eNB, i.e. the second network node 101, where an internal algorithm may check whether the number of handover failures towards the target cell 112 exceeds the failure threshold. Such an algorithm may count a failure every time the handover procedure is not completed at any stage.

The amount of failed handovers exceeding the failure threshold is for instance retrieved by detecting a failed handover from the source cell 111 to the target cell 112; incrementing a failure counter for each such detection of a failed handover, the failure counter initially having a default value; and determining that the failure threshold has been exceeded, when the failure counter has been incremented to an amount exceeding the failure threshold. Thereby, the number of failed handovers may be monitored in a feasible manner.

Alternatively, according to another example, the failure threshold may be based on a percentage of failures over a period of time. The percentage of failures may for instance be calculated based on the number of failed handovers in comparison to all handover attempts between the source cell 111 and the target cell 112.

Furthermore, a failure threshold may for instance be set by an operator via OSS 105 or by directly connecting to the target eNB, e.g. the second network node 102, and the value thereof may for instance vary depending on cell geographical location, or whether the target cell 112 is in an urban or rural area.

Action 202

In action 202, when the amount of failed handovers from the source cell 111 to the target cell 112 exceeds a failure threshold, the first network node 101 associates the target cell 112 with an indication indicating that the target cell 112 is unsuitable for handover. Thereby, the indication reflects that the target cell 112 is deemed inappropriate for handover. The association may be made automatically with immediate reaction once exceeding the failure threshold. Accordingly, with awareness of the arisen association reflecting a status of inappropriate handover due to a problem related to hardware and/or software issue(s), continued corresponding signaling handover failures and processing to the target cell 112 may instantly be avoided.

It should be noted that "associating" is intended to be interpreted in a broad manner, likewise including e.g. connecting, appending and attaching. The indication may for instance be represented by a parameter setting or an attribute stored or registered in the first network node 101.

To sum up, the actions above describe an approach in which the target cell 112 is associated with the indication when the failure threshold has been exceeded. Accordingly, the actions performed may, in an automatic and instant manner, by means of the suggested indication, reflect that the target cell 112 is deemed inappropriate for handover once the failure threshold is exceeded.

Action 203

Optional Action 203 further suggests that the first network node 101 monitors for the problem causing the handover failures. Thereby, the source eNB, such as the first network node 101, itself performs troubleshooting. Monitoring for the problem may imply searching for any problem event related to software and/or hardware of any arbitrary network node 105,101,102 or cell 111,112 that might have occurred at the time of, or slightly before, the amount of failed handovers exceeded the failure threshold.

According to embodiments herein, the problem may be associated with the second network node 102, and monitoring for the problem may comprise monitoring for at least one, or a combination of: a software error, e.g. a sleeping target cell, a configuration error, an alarm, a parameter change, or a hardware error, e.g. a hardware bug or a hardware replacement. Thereby, reasons for failures may be regarded which are related to the target eNB, such as the second network node 102, e.g. known from field experience rather than known merely from reasons listed in e.g. 3GPP 36.423 E-UTRAN X2 Application Protocol. The risk that the wireless device 121 faces a drop or that numerous handover attempts merely result in handover failures due to unidentified hardware and/or software issues, may hence be avoided or at least decreased.

Action 204

The manner in which the first network node 101 is able to learn of the problem causing the handover failures may vary. According to embodiments herein, as suggested in optional Action 204, the first network node 101 may learn of the problem from at least one, or a combination of: an alarm list, logs, parameter(s), which are maintained in one, or a combination of, the first 101, the second 102 and arbitrary network node(s) 105 of the wireless communications network 100. Thereby, the first network node 101, e.g. a source eNB, may retrieve input regarding the problem from e.g. lists residing in the source eNB itself, OSS 105 or the second network node 102, e.g. a target eNB.

Action 205

In optional Action 205, the first network node 101 may furthermore monitor for a solution event. Thereby, the first network node 101 itself performs troubleshooting to an even greater extent. Monitoring for the solution event may imply monitoring for an occurrence of a solution event indicating that the problem has been restored, for instance a clearance of the problem or a hardware replacement, among arbitrary entities such as any arbitrary network node 105, or any of nodes 101,102 or cell 111,112. Which solution event that is considered to restore which problem may vary along with the implementation at hand, and determining mapping thereof may be a task of e.g. a designer or other person.

It should be noted that "restored" is intended to be interpreted in a broad manner, likewise including e.g. ceased, reset and solved.

According to embodiments herein, monitoring for the solution event may comprise monitoring for one, or a combination of: a clearance of the problem, a re-start of a network node 101,102,105 e.g. serving the source cell 111 and/or target cell 112, a re-start of the source cell 111 and/or target cell 112, a hardware replacement, a start and/or re-start of a radio and/or a digital unit, a ceased alarm, e.g. on a random-access channel, RACH, or a change and/or re-setting of a parameter associated with the problem. Thereby, there are suggested feasible solution events potentially restoring corresponding problems.

Action 206

Alternatively and/or additionally to any of Actions 203-205, the first network node 101 learning of a solution event may implicate that another entity assists in monitoring for the solution event. Accordingly, optional Actions 206 and 207 may follow directly after Action 202, i.e. after associating the target cell with the indication.

Action 206 comprises informing the second network node 102 serving the target cell 112, about the target cell 112 being associated with the indication. Thereby, the second network node 102, e.g. the target eNB, is made aware of that the target cell 112 is associated with the indication indicating that the target cell 112 is unsuitable for handover. Accordingly, the source eNB, such as the first network node 101, makes the second network node 102 aware of the presence of potential software and/or hardware issues, and thus enables the second network node 102 to take appropriate action, e.g. assisting in troubleshooting.

The manner in which the second network node 102 is informed may vary along with the implementation at hand. Said informing may allow for two different systems being involved, such as for instance UMTS, GSM, WCDMA, UTRAN, or LTE, which may imply different signalling protocols. According to an example scenario, the message may be relayed via OSS 105, to take advantage of that no change of signalling protocol may be required and that the OSS 105 may be aware of changes such as hardware restarts, parameter changes, triggered alarms etc. in the source and/or target eNBs.

According to embodiments herein, this action of informing the second network node 102 about the target cell 112 being associated or dissociated with the indication may comprise informing the second network node by means of a message sent directly to the second network node 102 and/or relayed via one or several arbitrary network nodes 105 of the wireless communications network 100. The message is a unique message or part of an already existing message. Furthermore, the message is supported by one or several wireless communications network standard protocols, including at least one of: UMTS, GSM, WCDMA, UTRAN, and 3GPP LTE. Thereby, a feasible message type is suggested, which supports different systems and/or varying signalling protocols.

Action 207

In optional Action 207, the first network node 101 receives information about the solution event from the second network node 102 serving the target cell 112. Thereby, the first network node 101 receives input regarding the solution event from the second network node 102, which thus amounts to the second network node 102 assisting in troubleshooting alternatively or in addition to the first network node 101. The manner in which the first network node 101 receives the information may vary with the implementation at hand, and may be similar, although reversed, to the informing described in Action 206.

Action 208

Regardless of if the first network node 101 has learned of the solution event by monitoring for it by itself or received info about the solution event from e.g. the second network node 102, in optional Action 208 the first network node 101 may dissociate the target cell 112 from the indication, when learning that the solution event has occurred indicating that the problem associated with at least some of the failed handovers has been restored. Thereby, the dissociation instantly reflects that at least some of the hardware and/or software issue(s) have ceased and that the target cell 112 once again may be deemed suitable for handover. The dissociation is made with immediate reaction once learning of the occurred solution event. Accordingly, with automatic and immediate awareness of the arisen dissociation reflecting that the target cell no longer is deemed inappropriate for handover, long delays in resuming handovers, which may occur due to human factors, may instantly be decreased.

It should be noted that "dissociating" is intended to be interpreted in a broad manner, likewise including e.g. removing, deleting, changing and toggling.

Should there be no learning that a solution event has occurred, the target cell 112 may remain deemed unsuitable for handover.

Furthermore, regarding dissociation as well as association of the target cell 112 from/with the indication, according to embodiments herein, the statement that the target cell 112 is applicable for handover may be based on the presence of a target cell entry for the target cell 112 in a neighbour cell list being comprised in the first network node 101. Then, associating (Actions 202, 209) the target cell 112 with the indication may comprise setting a target cell parameter of the target cell entry to a first value. Furthermore, dissociating (Action 208) the target cell 112 from the indication may then comprise setting the target cell parameter to a second value, which second value differs from the first value. According to embodiments herein, in combination with the wireless communications network 100 being a 3GPP LTE network, and the first network node 101 being a source E-UTRAN NodeB, eNB, serving the source cell 111, the neighbour cell list mentioned in the foregoing may be a Neighbour Relation Table (NRT) supported by the 3GPP LTE Automatic Neighbour Relation (ANR) functionality. Thereby, feasible implementations are suggested, according to which the target cell entry for the target cell 112 in the neighbour cell list may represent the target cell 112 being applicable for handover, and association and dissociation may be performed by setting a target cell parameter of the target cell entry to a first and second value respectively. The first and second values may be represented by any arbitrary differing values. The first value may for instance be represented by 0 (or 1), and the second value by 1 (or 0), such that setting the target cell parameter to the first and second values may be represented by toggling the target cell parameter between 0 and 1. Thereby, a convenient and practical implementation is suggested.

Action 209

Dissociating the target cell 112 from the indication may imply that the target cell 112 once again may be suitable for handover. This is, however, not necessarily always the case. In some situations, a solution event such as e.g. a ceased alarm or a parameter re-setting, might not necessarily fully restore the problem. Furthermore, additional hardware and/or software issue(s) may be present which cause failed handovers, which additional issues are not restored by the solution event. Subsequently, restoring of the problem may not necessarily result in successful subsequent handover attempts.

Accordingly, optional Action 209 may follow directly after Action 208, i.e. after dissociating the target cell 112 from the indication. In Action 209, the first network node 101 may associate the target cell 112 with the indication, when a subsequent amount of failed handovers from the source cell 111 to the target cell 112 exceeds a verification threshold occurring after the target cell 112 has been dissociated from the indication. Thereby, the indication reflects in an automatic and instant manner, that the target cell 112 remains, or again has become, deemed unsuitable for handover. That is, an automatic additional test is initiated, searching to judge if subsequent handovers fail. Accordingly, the association in Action 209 enables an instant awareness of further failed handover attempts following learning that a solution event has occurred, which may suggest that the solution event did not fully restore the problem, or that additional hardware and/or software issue (s) not restored by the solution event may still be present.

The verification threshold may be set to any arbitrary value suitable for the application at hand, and may for instance be equal to the failure threshold. A verification threshold lower than the failure threshold may however be more relevant to set, e.g. 3-10, whereby merely a few handover failures may amount to the subsequent amount of failed handovers. Monitoring of the number of further failed handover attempts may be performed as suggested for the failure threshold discussed in Action 201 in conjunction with FIG. 2.

Following directly after Action 209, i.e. after associating the target cell 112 with the indication when the verification threshold has been exceeded, the method may continue to the End or to optional Actions 210 and/or 211 described further down. Alternatively, the method may return e.g. to optional Action 203, i.e. to monitor for the problem, such that further troubleshooting likely related to additional software and/or hardware issues may be performed.

Should there be no detection of the verification threshold being exceeded, then the problem may be considered to be solved and the target cell 112 may remain dissociated from the indication.

Action 210

In optional action 210, the first network node 101 may inform the second network node 102 about which relation the target cell 112 has with the indication. Thus, according to some embodiments herein, on one hand, Action 210 may follow directly after Action 209, i.e. after association of the target cell 112 with the indication, such informing may comprise that the first network node 101 informs the second network node 102 serving the target cell 112, about the target cell 112 being associated with the indication. Thereby, the second network node 102 may be made aware of that the target cell 112 is associated with the indication indicating that the target cell 112 is unsuitable for handover. Subsequently, the first network node 101 may make the second network node 102 aware of the presence of potential software and/or hardware issues, and may thus enable the second network node 102 to take appropriate action, e.g. assisting in troubleshooting.

On the other hand, Action 210 may follow directly after Action 208, i.e. after dissociating the target cell 112 from the indication, whereby the informing may comprise informing about the target cell 112 being dissociated from the indication. Thereby, the second network node 102 may be made aware of that the target cell 112 no longer is deemed inappropriate for handover, why the second network node 102 may take appropriate action, e.g. cease monitoring for a problem obstructing handover and subsequently a solution potentially restoring handover.

The manner of informing may for instance be performed as suggested in Action 206.

Action 211

In optional action 211, the first network node 101 may evaluate if the target cell 112 is suitable for a subsequent handover of the wireless device 121 or another wireless device, based on whether the target cell 112 is associated with the indication or not. Thereby, it is suggested that the indication is confronted for determining whether or not a subsequent handover attempt may be suitable. Subsequently, should the target cell 112 be associated with the indication, the evaluation may result in the decision to remove the neighbour relation to the target cell 112 for the source cell 111. Such removal may for instance be implemented by removing the target cell entry for the target cell 112 from the neighbour cell list, e.g. the NRT, of the source cell 111, subsequently providing for the target cell 112 to be inapplicable for handover. According to one example, such removal is performed by O&M 105. Furthermore, such removal may be initiated after a period of time following the target cell 112 being associated with the indication, or immediately upon the association should such an approach be desirable.

On the other hand, should the target cell 112 be dissociated from the indication, the evaluation may result in the decision to keep the neighbour relation to the target cell 112.

Figure 3:
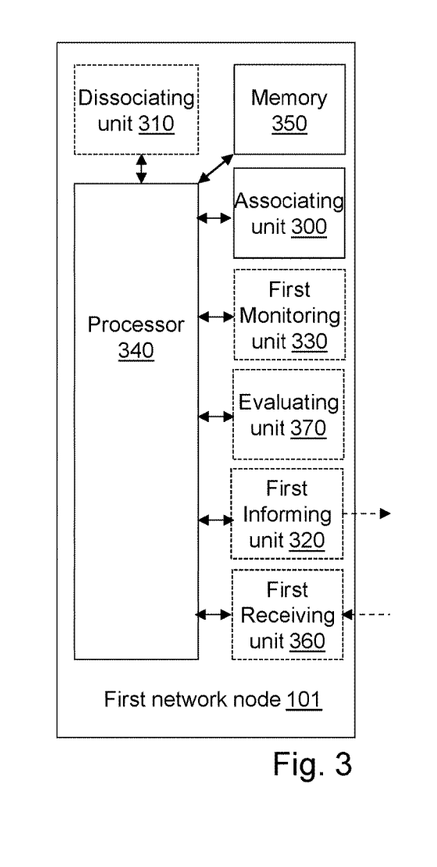
FIG. 3 is a schematic block diagram illustrating embodiments of a first network node.

To perform the method actions for handling handover failures for the target cell 112 described above in relation to FIG. 2, the first network node 101 comprises the following components depicted in FIG. 3. As mentioned above, the target cell 112 is applicable for handover of the wireless device 121 in a wireless communications network 100 from a source cell 111 to the target cell 112.

The first network node 101 comprises an associating unit 300 adapted to associate (Action 202) the target cell 112 with the indication indicating that the target cell 112 is unsuitable for handover, when the amount of failed handovers from the source cell 111 to the target cell 112 exceeds (Action 201) the failure threshold.

According to some possible embodiments, the first network node 101 may furthermore comprise a dissociating unit 310 adapted to dissociate (Action 208) the target cell 112 from the indication, when learning that the solution event has occurred indicating that the problem associated with at least some of the failed handovers has been restored.

In some possible embodiments, the first network unit 101 may further comprise a first informing unit 320 adapted to inform (Action 206) the second network node 102 serving the target cell 112 about the target cell 112 being dissociated from the indication, when the target cell 112 is dissociated from the indication.

According to other possible embodiments herein, the associating unit 300 may further be adapted to associate (Action 209) the target cell with the indication, when the subsequent amount of failed handovers from the source cell 111 to the target cell 112 exceeds the verification threshold occurring after the target cell 112 has been dissociated from the indication.

In yet some possible embodiments, the first informing unit 320 may further be adapted to inform (Action 210) the second network node 102 serving the target cell 112 about the target cell 112 being associated with the indication, when the target cell 112 is associated with the indication.

According to additional possible embodiments herein, the first network node 101 may further comprise a first monitoring unit 330 adapted to monitor (Action 203) for the problem and further adapted to monitor (Action 205) for the solution event. Alternatively or additionally, the first network node 101 may further comprise a first receiving unit 360 adapted to receive (Action 207) information about the solution event from the second network node 102 serving the target cell 112.

In some possible embodiments, the first network unit 101 further comprises an evaluating unit 370 adapted to evaluate (Action 211) if the target cell 112 is suitable for a subsequent handover of the wireless device 121 or another wireless device, based on whether the target cell 112 is associated with the indication or not.

According to other possible embodiments herein, the first network node 101 may be a source base station 101 serving the source cell 111. Thereby, by allowing the source base station to represent the first network node 101, a practical, convenient and feasible approach is presented.

The embodiments and features described herein for handling handover failures for the target cell 112 may be implemented through one or more processors, such as a processor 340 in the first network node 101 depicted in FIG.

3, together with computer program code for performing the functions and actions of the embodiments herein. The program code mentioned above may also be provided as a computer program product, for instance in the form of a data carrier carrying computer program code for performing the embodiments herein when being loaded into the in first network node 101. One such carrier may be in the form of a CD ROM disc. It is however feasible with other data carriers such as a memory stick. The computer program code may furthermore be provided as pure program code on a server and downloaded to the first network node 101.

The first network node 101 may further comprise a memory 350 comprising one or more memory units. The memory 350 may be arranged to be used to store information about the target cell 112 being associated with, or dissociated from, the indication indicating that the target cell 112 is unsuitable for handover, and/or data communication. Further to store data, configurations, schedulings, and applications, to perform the methods herein when being executed in the first network node 101.

Those skilled in the art will also appreciate that the associating unit 300, the dissociating unit 310, the first informing unit 320, the first monitoring unit 330, the first receiving unit 360, and the evaluating unit 370 described above may refer to a combination of analog and digital circuits, and/or one or more processors configured with software and/or firmware, e.g. stored in a memory such as the memory 350, that when executed by the one or more processors such as the processor 340 perform as described above. One or more of these processors, as well as the other digital hardware, may be included in a single Application-Specific Integrated Circuitry (ASIC), or several processors and various digital hardware may be distributed among several separate components, whether individually packaged or assembled into a System-on-a-Chip (SoC).

Figure 4:
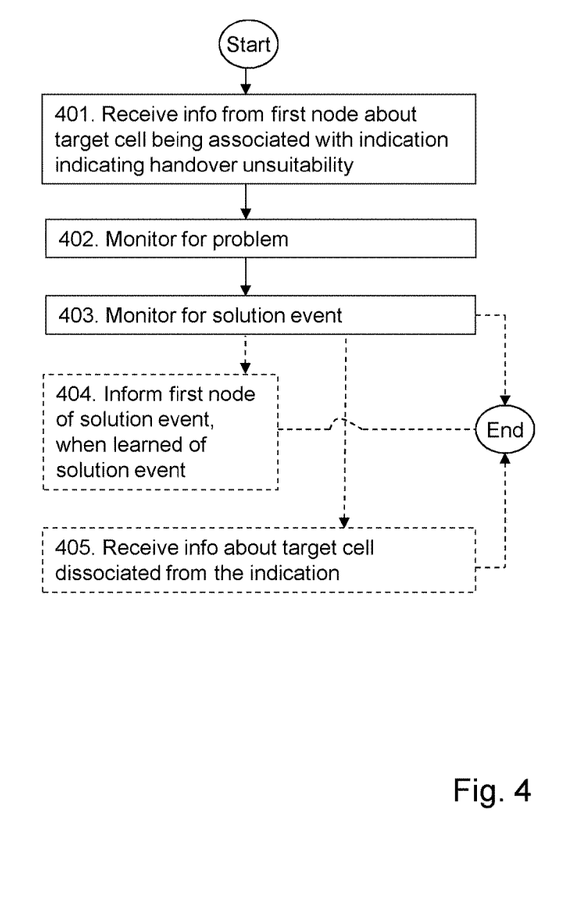
FIG. 4 is a flowchart depicting embodiments of a method performed by a second network node.

An example of possible embodiments of a method performed by the second network node 102 for handling handover failures for the target cell 112, will now be described with reference to a flowchart depicted in FIG. 4 and with further reference to FIG. 1. As mentioned above, the target cell 112 is applicable for handover of the wireless device 121 in the wireless communications network 100 from the source cell 111 to the target cell 111. The example scenario of FIG. 4 corresponds to potentially interact with the example scenario of FIG. 2, such that alternatives and embodiments described in conjunction with FIG. 2 to great extent may apply as well to FIG. 4. The method of FIG. 4 is discussed seen from the perspective of the second network node 102, which again may be a target eNB. In an example scenario, preceding the actions of the flowchart depicted in FIG. 4, it is assumed that the wireless device 121 is subjected to handover attempts from the source cell 111 to the target cell 112. The attempts are, however, failing.

The method comprises the following actions, which actions may be taken in any suitable order. Dashed lines of some boxes in FIG. 4 indicate that these actions are optional and not mandatory.

Action 401

In Action 401 the second network node 102 receives, from the first network node 101 serving the source cell 111, information about the target cell 112 being associated, see corresponding Action 202, Action 209, with an indication. The indication indicates that the target cell 112 is unsuitable for handover due to an amount of failed handovers from the source cell 111 to the target cell 112 exceeding, see corresponding Action 201, a failure threshold, and/or due to a subsequent amount of failed handovers from the source cell 111 to the target cell 112 exceeding a verification threshold. Thereby, the second network node 102, e.g. the target eNB, is made aware from the first network node 101, e.g. the source eNB, of that the target cell 112 is associated with the indication indicating that the target cell 112 is unsuitable for handover. Accordingly, the target eNB is made aware of the presence of a hardware and/or software issue(s) obstructing handover, thus enabling for the target eNB to take appropriate action, e.g. assisting in troubleshooting.

Alternatives and embodiments related to Action 401 are previously discussed in Actions 201-211 in conjunction with FIG. 2, and will not be further discussed.

Action 402

In Action 402 the second network node 102 monitors for a problem associated with at least some of the failed handovers and/or the subsequent failed handovers. Thereby, the second network node 102 assists in performing troubleshooting. Monitoring for the problem may imply searching for any problem event related either to software and/or hardware that might have occurred at the time of, or slightly before, the amount of failed handovers exceeded the failure threshold or the subsequent amount of failed handovers exceeded the verification threshold. According to embodiments herein, the second network node 102 may learn of the problem from for instance an alarm list, logs, or parameter (s), which are maintained in one, or a combination of, the first, the second and arbitrary network nodes 101, 102, 105 of the wireless communications network 100. Thereby, the second network node 102 may check for input regarding the problem in a variety of manners.

Alternatives and embodiments related to Action 402 are previously discussed in Action 203 in conjunction with FIG. 2.

Action 403

In Action 403 the second network node 102 monitors for a solution event indicating that the problem is restored. Monitoring for the solution event may imply monitoring for an occurrence of a solution event indicating that the problem has been restored among any entities in the network, such as any of the network nodes 105,101,102 and cells 111,112. Thereby, the second network node 102 assists in performing troubleshooting.

Alternatives and embodiments related to Action 403 are previously discussed in Action 205 in conjunction with FIG. 2.

Action 404

In optional Action 404, the second network node 102, e.g. the target eNB, informs the first network node 101 about the solution event, when learning of the solution event.

When observing an occurrence of a solution event which indicates to have restored the problem associated with at least some of the failed handover attempts, the target eNB, such as the second network node 102, may instantly inform the first network node 101. Thereby, the first network node 101 may take some appropriate action, e.g. cease monitoring for a problem obstructing handover and/or a solution restoring handover, and dissociate, see corresponding Action 208, the target cell 112 from the indication.

The manner in which the first network node 101 may be informed, along with alternatives and embodiments related to Action 404, is previously discussed in Action 206 in conjunction with FIG. 2.

Action 405

Action 405 is an alternative or additional optional action in which the second network node 102 may receive, from the first network node 101, information about the target cell 112 being dissociated, see corresponding Action 208, from the indication due to the first network node 101 learning that a solution event has occurred indicating that the problem is restored. Thereby, the second network node 102 may be made aware of that the target cell 112 no longer is deemed inappropriate for handover, why the second network node 102 may take appropriate action, e.g. cease monitoring for a problem obstructing handover and/or a solution restoring handover.

The manner in which the second network node 102 may be informed, along with alternatives and embodiments related to Action 405, is previously discussed in Actions 206 and 210 in conjunction with FIG. 2.

To sum up, the actions above described in conjunction with the exemplifying scenario of FIG. 4 have shown an approach according to which the second network node 102 monitors for the problem and for the solution event, and potentially informs the first network node 101. Accordingly, the actions performed in the second network node 102 may assist the first network node 101 to, in an automatic and instant manner, reflect when the target cell 112 has recovered from one or several hardware and/or software issues obstructing handover of the wireless device 121.

Figure 5:
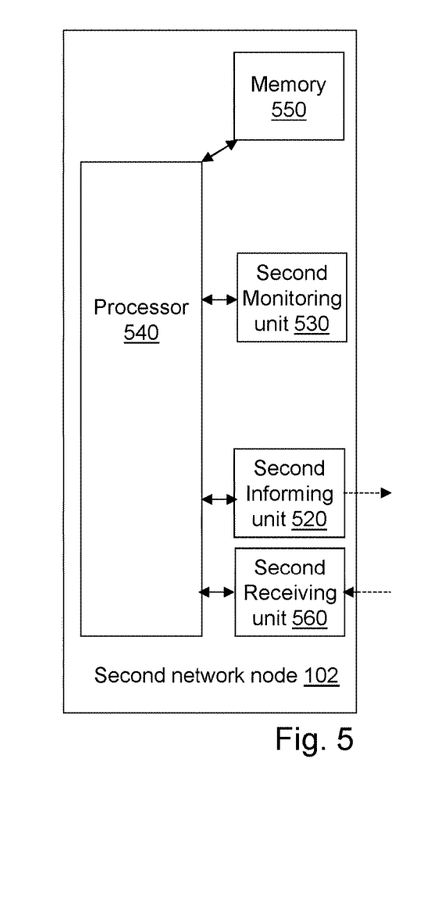
FIG. 5 is a schematic block diagram illustrating embodiments of a second network node.

To perform the method actions for handling handover failures for the target cell 112 described above in relation to FIG. 4, the second network node 102 comprises the following components depicted in FIG. 5. As mentioned above, the target cell 112 is applicable for handover of the wireless device 121 in a wireless communications network 100 from a source cell 111 to the target cell 112.

The second network node 102 comprises a second receiving unit 560 adapted to receive (Action 401), from the first network node 101 serving the source cell 111, information about the target cell 112 being associated with the indication. The indication indicates that the target cell 112 is unsuitable for handover due to the amount of failed handovers from the source cell 111 to the target cell 112 exceeding (see corresponding Action 201 a failure threshold, and/or due to a subsequent amount of failed handovers from the source cell 111 to the target cell 112 exceeding a verification threshold.

The second network node 102 furthermore comprises a second monitoring unit 530 adapted to monitor (Action 402) for the problem associated with at least some of the failed handovers and/or the subsequent failed handovers, which second monitoring unit 530 further is adapted to monitor (Action 403) for a solution event indicating that the problem is restored.

Additionally, the second network node 102 comprises a second informing unit 520 adapted to inform (Action 404) the first network node 101 about the solution event, when learning of the solution event.

In some possible embodiments, the second receiving unit 560 may further be adapted to receive (Action 405), from the first network node 101, information about the target cell 112 being dissociated (see corresponding Action 208) from the indication due to the first network node 101 learning that a solution event has occurred indicating that the problem is restored.

According to further possible embodiments herein, the second network node 102 may be a target base station serving the target cell 112. Thereby, by allowing the target base station to represent the second network node 102, a practical, convenient and feasible approach is presented.

The embodiments herein for handling handover failures for the target cell 112 may be implemented through one or more processors, such as a processor 540 in the second network node 102 depicted in FIG. 5, together with computer program code for performing the functions and actions of the embodiments herein. The program code mentioned above may also be provided as a computer program product, for instance in the form of a data carrier carrying computer program code for performing the embodiments herein when being loaded into the in second network node 102. One such carrier may be in the form of a CD ROM disc. It is however feasible with other data carriers such as a memory stick. The computer program code may furthermore be provided as pure program code on a server and downloaded to the second network node 102.

The second network node 102 may further comprise a memory 550 comprising one or more memory units. The memory 550 may be arranged to be used to store information about the target cell 112 being associated with, or dissociated from, the indication indicating that the target cell 112 is unsuitable for handover, and/or data communication. Further to store data, configurations, schedulings, and applications, to perform the methods herein when being executed in the second network node 102.

Those skilled in the art will also appreciate that the second informing unit 520, the second monitoring unit 530, and the second receiving unit 560 described above may refer to a combination of analog and digital circuits, and/or one or more processors configured with software and/or firmware, e.g. stored in a memory such as the memory 550, that when executed by the one or more processors such as the processor 540 perform as described above. One or more of these processors, as well as the other digital hardware, may be included in a single ASIC, or several processors and various digital hardware may be distributed among several separate components, whether individually packaged or assembled into a SoC.

The embodiments and features described herein are not limited to the above described preferred embodiments. For instance, according to alternative embodiments, when the target cell 112 has been associated with the indication for some time, it might be advantageous to re-test the handover status of the target cell 112. Subsequently, embodiments herein may further comprise initiating an attempt to handover the first wireless device 121 or another wireless device to the target cell 121, and/or performing a power measurement, e.g. Reference Signal Received Power, RSRP, from the first wireless device 121 or another wireless device to the target cell 112, if the target cell 112 after a period of time still is associated with the indication. Thereby, on one hand, a few or all of the actions of the example scenario in FIG. 2 may be repeated in order to re-test the handover status. On the other hand, a status of the target cell 112 may be evaluated based on the RSRP, for instance relevant should the target cell 112 experience a "sleeping cell" software bug scenario.

Additionally, embodiments herein may further comprise removing the previously mentioned target cell entry for the target cell from the neighbour cell list, if said initiated handover attempt failed and/or the performed power measurement fell short of a measurement threshold. Thereby, an approach is suggested according to which the target cell 112 may cease to qualify as being applicable for handover should the initiated handover attempt fail and/or the performed power measurement fall short of the measurement threshold.

Further various alternatives, modifications and equivalents may be used. Therefore, the above embodiments should not be taken as limiting the scope of the invention, which is defined by the appending claims.

When using the word "comprise" or "comprising" it shall be interpreted as non-limiting, i.e. meaning "comprise at least of".

It should be realized that embodiments herein are not limited to 3GPP LTE. The above examples are given for illustrative purposes, and similar scenarios may be valid in a variety of wireless communications networks.

The invention claimed is:

1. A method, performed by a first network node, for handling handover failures for a target cell, the target cell being applicable for handover of a wireless device in a wireless communications network from a source cell to the target cell, the method comprising:
   determining an amount of failed handovers from the source cell to the target cell;
   comparing the amount of failed handovers to a failure threshold; and
   in response to the amount of failed handovers from the source cell to the target cell exceeding the failure threshold, associating the target cell with an indication indicating that the target cell is unsuitable for handover.

2. The method of claim 1, further comprising, in response to learning that a solution event has occurred indicating that a problem associated with at least some of the failed handovers has been resolved, dissociating the target cell from the indication.

3. The method of claim 2, further comprising, when the target cell is dissociated from the indication, informing a second network node serving the target cell about the target cell being dissociated from the indication.

4. The method of claim 3:
   wherein informing the second network node about the target cell being dissociated with the indication comprises informing the second network node by means of a message sent directly to the second network node and/or relayed via one or several arbitrary network nodes of the wireless communications network, which message is a unique message or part of an already existing message;
   wherein the message is supported by one or several wireless communications network standard protocols, including at least one of:
      Universal Mobile Telecommunications System (UMTS);
      Global System for Mobile Communications (GSM);
      Wideband Code Division Multiple Access (WCDMA);
      UMTS Terrestrial Radio Access Network (UTRAN); and
      3rd Generation Partnership Project Long Term Evolution (3GPP LTE).

5. The method of claim 2, further comprising, when the target cell is dissociated from the indication and in response to a subsequent amount of failed handovers from the source cell to the target cell exceeding a verification threshold occurring after the target cell has been dissociated from the indication, re-associating the target cell with the indication.

6. The method of claim 2, further comprising at least one of:
   monitoring for the problem;
   monitoring for the solution event;
   receiving information about the solution event from a second network node serving the target cell.

7. The method of claim 6:
   wherein the problem is associated with the second network node serving the target cell; and
   wherein the monitoring for the problem comprises monitoring for at least one of a software error and a hardware error.

8. The method of claim 6, wherein the monitoring for the solution event comprises monitoring for at least one of:
   a clearance of the problem;
   a re-start of a network node serving the source cell and/or target cell;
   a re-start of the source cell and/or the target cell;
   a hardware replacement;
   a start and/or re-start of a radio and/or a digital unit;
   a ceased alarm;
   a change and/or re-setting of a parameter associated with the problem.

9. The method of claim 2:
   further comprising learning of the problem from at least one of:
      an alarm list;
      logs;
      one or more parameters;
   wherein the list, logs, and parameters are maintained in one more network nodes of the wireless communications network.

10. The method of claim 2:
    wherein the target being applicable for the handover is based on presence of a target cell entry for the target cell in a neighbor cell list comprised in the first network node;
    wherein said associating the target cell with the indication comprises setting a target cell parameter of the target cell entry to a first value; and
    wherein said dissociating the target cell from the indication comprises setting the target cell parameter to a second value, the second value different from the first value.

11. The method of claim 10:
    wherein the wireless communications network is a 3rd Generation Partnership Project Long Term Evolution (3GPP LTE) network;
    wherein the first network node is a source Evolved Universal Mobile Telecommunications System Terrestrial Radio Access Network NodeB (eNB) serving the source cell; and
    wherein the neighbor cell list is a Neighbor Relation Table (NRT) supported by a 3GPP LTE Automatic Neighbor Relation (ANR) functionality.

12. The method of claim 1, further comprising, when the target cell is associated with the indication, informing a second network node serving the target cell about the target cell being associated with the indication.

13. The method of claim 12:
    wherein informing the second network node about the target cell being associated with the indication comprises informing the second network node by means of a message sent directly to the second network node and/or relayed via one or several arbitrary network nodes of the wireless communications network, which message is a unique message or part of an already existing message;
    wherein the message is supported by one or several wireless communications network standard protocols, including at least one of:
       Universal Mobile Telecommunications System (UMTS);
       Global System for Mobile Communications (GSM);
       Wideband Code Division Multiple Access (WCDMA);

UMTS Terrestrial Radio Access Network (UTRAN); and

3rd Generation Partnership Project Long Term Evolution (3GPP LTE).

14. The method of claim 1, further comprising evaluating, based on whether the target cell is associated with the indication or not, if the target cell is suitable for a subsequent handover of the wireless device or another wireless device.

15. A method, performed by a second network node, for handling handover failures for a target cell, the target cell being applicable for handover of a wireless device in a wireless communications network from a source cell to the target cell, the method comprising:

receiving, from a first network node serving the source cell, information about the target cell being associated with an indication that indicates that the target cell is unsuitable for handover due to:
  an amount of failed handovers from the source cell to the target cell exceeding a failure threshold; and/or
  a subsequent amount of failed handovers from the source cell to the target cell exceeding a verification threshold;
monitoring for a problem associated with at least some of the failed handovers and/or the subsequent failed handovers;
monitoring for a solution event indicating that the problem is resolved; and
in response to learning of the solution event, informing the first network node about the solution event.

16. The method of claim 15, further comprising receiving, from the first network node, information about the target cell being dissociated from the indication due to the first network node learning that the solution event has occurred indicating that the problem is resolved.

17. A first network node for handling handover failures for a target cell, wherein the target cell is applicable for handover of a wireless device in a wireless communications network from a source cell to the target cell, the first network node comprising:

one or more processing circuits configured to:
  determine an amount of failed handovers from the source cell to the target cell;
  compare the amount of failed handovers to a failure threshold; and
  in response to the amount of failed handovers from the source cell to the target cell exceeding the failure threshold, associate the target cell with an indication indicating that the target cell is unsuitable for handover.

18. The first network node of claim 17, wherein the one of more processing circuits are further configured to function as a dissociating circuit adapted to, in response to learning that a solution event has occurred indicating that a problem associated with at least some of the failed handovers has been resolved, dissociate the target cell from the indication.

19. The first network node of claim 18, wherein the one of more processing circuits are further configured to function as:

a first monitoring circuit adapted to monitor for the problem and further adapted to monitor for the solution event; and/or a first receiving circuit adapted to receive information about the solution event from a second network node serving the target cell.

20. The first network node of claim 17, wherein the one of more processing circuits are further configured to function as a first informing circuit adapted to, in response to the target cell being dissociated from the indication, inform a second network node serving the target cell about the target cell being dissociated from the indication.

21. The first network node of claim 20, wherein the first informing circuit further is adapted to, in response to the target cell being associated with the indication, inform the second network node serving the target cell about the target cell being associated with the indication.

22. The first network node according to claim 17, wherein the associating circuit further is adapted to, in response to a subsequent amount of failed handovers from the source cell to the target cell exceeding a verification threshold occurring after the target cell has been dissociated from the indication, re-associate the target cell with the indication.

23. The first network node of claim 17, wherein the one of more processing circuits are further configured to function as an evaluating circuit adapted to evaluate, based on whether the target cell is associated with the indication or not, if the target cell is suitable for a subsequent handover of the wireless device or another wireless device.

24. The first network node of claim 17, wherein the first network node is a source base station serving the source cell.

25. A second network node for handling handover failures for a target cell, wherein the target cell is applicable for handover of a wireless device in a wireless communications network from a source cell to the target cell, the second network node comprising:

one or more processing circuits configured to function as:
  a second receiving circuit adapted to receive, from a first network node serving the source cell, information about the target cell being associated with an indication, indicating that the target cell is unsuitable for handover due to:
    an amount of failed handovers from the source cell to the target cell exceeding a failure threshold; and/or
    a subsequent amount of failed handovers from the source cell to the target cell exceeding a verification threshold;
  a second monitoring circuit adapted to:
    monitor for a problem associated with at least some of the failed handovers and/or the subsequent failed handovers;
    monitor for a solution event indicating that the problem is resolved; and
  a second informing circuit adapted to, in response to learning of the solution event, inform the first network node about the solution event.

26. The second network node of claim 25, wherein the second receiving circuit is adapted to receive, from the first network node, information about the target cell being dissociated from the indication due to the first network node learning that the solution event has occurred indicating that the problem is resolved.

27. The second network node of claim 25, wherein the second network node is a target base station serving the target cell.

* * * * *

UNITED STATES PATENT AND TRADEMARK OFFICE
CERTIFICATE OF CORRECTION

PATENT NO. : 9,692,682 B2
APPLICATION NO. : 14/440371
DATED : June 27, 2017
INVENTOR(S) : Yamine et al.

Page 1 of 1

It is certified that error appears in the above-identified patent and that said Letters Patent is hereby corrected as shown below:

In the Specification

In Column 6, Line 5, delete "e.g. 51" and insert -- e.g. S1 --, therefor.

In Column 13, Line 43, delete "target cell 111." and insert -- target cell 112. --, therefor.

In Column 15, Lines 36-37, delete "(see corresponding Action 201" and insert -- (see corresponding Action 201) --, therefor.

In Column 16, Line 43, delete "target cell 121," and insert -- target cell 112, --, therefor.

Signed and Sealed this
Seventh Day of April, 2020

Andrei Iancu
*Director of the United States Patent and Trademark Office*